United States Patent Office.

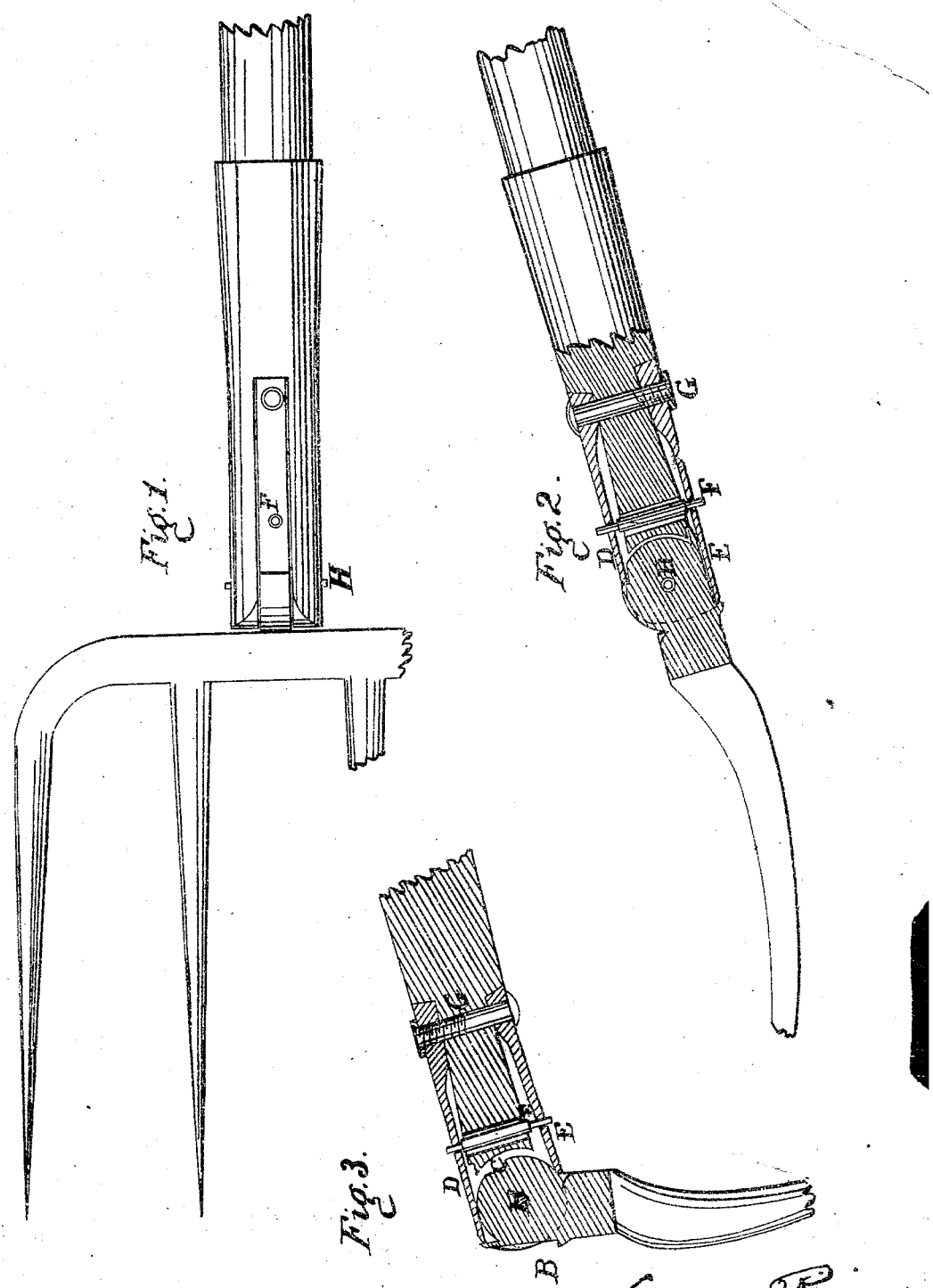

LYMAN RIGGS, OF LANSING, MICHIGAN.

Letters Patent No. 73,390, dated January 14, 1868.

---

IMPROVEMENT IN CONVERTIBLE FORK AND HOOK.

---

The Schedule referred to in these Letters Patent and making part of the same.

---

TO WHOM IT MAY CONCERN:

Be it known that I, LYMAN RIGGS, of Lansing, in the county of Ingham, and State of Michigan, have invented a new and valuable Improvement in Convertible Forks; and I do hereby declare that the following is a full, clear, and exact description of the construction and operation of the same, reference being had to the annexed drawings, making a part of this specification, and to the letters and figures of reference marked thereon.

The object of my invention is to construct better means than have heretofore been devised for converting a hay or manure-fork into a hook or hoe at pleasure.

To this end I construct the shank of the fork in the form shown on Figures 2 and 3 of the drawings, and adjust thereto the devices on the handle, also therein shown, giving to the whole, when united, the form shown on Figure 1.

Letters A, B, and C are notches on the shank, fitted for the reception of the springs on the handle hereinafter mentioned. Letters D and E are springs affixed to the handle, and working in the notches A and B, in the manner represented. F is a pin, working loosely in a groove, as shown. It has shoulders, which rest respectively against the insides of springs C and D. It also passes through said springs, and forms projections on the outsides thereof, respectively, in the manner represented. Letter G is a bolt that holds the springs C and D in their places and H is a bolt, that connects the shank of the fork with the handle, and upon which the said shank rotates.

The mode of operating my device is fully represented on fig. 3 of the drawings.

What I claim as my invention, and desire to secure by Letters Patent, is—

1. The pin F, constructed and operating substantially as and for the purposes set forth.

2. In combination with the shank of a fork, having notches A, B, and C, the springs D and E, constructed and operating substantially as specified.

LYMAN RIGGS.

Witnesses:
   A. E. COWLES,
   M. D. OSBAND.